United States Patent Office.

CHRISTIAN RUDOLPH, OF HÖCHST-ON-THE-MAIN, GERMANY, ASSIGNOR TO FARBWERKE, VORMALS MEISTER, LUCIUS & BRÜNING, OF SAME PLACE.

MATERIAL FOR THE MANUFACTURE OF METAMETHYL INDIGO.

SPECIFICATION forming part of Letters Patent No. 276,889, dated May 1, 1883.

Application filed July 22, 1882. (Specimens.)

*To all whom it may concern:*

Be it known that I, CHRISTIAN RUDOLPH, of Höchst-on-the-Main, Germany, have invented certain new and useful Improvements in Materials Used in the Manufacture of Metamethyl Indigo; and I do hereby declare that the following is a full, clear, and exact description of the invention, which will enable others skilled in the art to which it appertains to make and use the same.

My invention relates to the production of orthonitrometamethylbenzaldehyde, which is to be used as a material in the manufacture of metamethyl indigo from the metamethylbenzaldehyde (toluylaldehyde.) The toluylaldehyde, which can be produced after well-known methods from metaxylol, on being nitrated, acts like the metabromobenzoic acid—*i. e.*, it allows the hydrogen atom standing in ortho position with respect to the CHO group to be replaced by the nitro group.

The following is a special method for producing the compound: Dissolve while cooling twelve parts of toluylaldehyde in six times the quantity, by weight, of concentrated sulphuric acid. Into this solution I let flow slowly, at a temperature of about 59° Fahrenheit (15° centigrade,) a cold mixture of ten parts nitric acid (1.4 specific gravity) and of twenty parts concentrated sulphuric acid. When the mass resulting from the reaction is poured into ice-water the nitroaldehyde produced separates in the form of an oil, which is repeatedly washed in water and a dilute carbonate-of-soda solution. The orthonitrometamethylbenzaldehyde such as we obtain forms an oil of a yellowish color. It is sparingly soluble in water, easily in alcohol, benzole, ether, and acetone. By shaking this aldehyde with bisulphite of sodium the two combine, and the compound separates in the form of colorless shining scales. For the production of methyl indigo it may be used directly or after being purified by distilling in a current of steam.

Having thus described my invention, what I claim as new, and desire to secure by Letters Patent, is—

1. The herein-described process for producing orthonitrometamethylbenzaldehyde, which consists in first dissolving toluylaldehyde in concentrated sulphuric acid, and thereafter letting flow slowly into same a mixture of nitric and concentrated sulphuric acids, after the reaction the mass being cooled in order to separate the nitroaldehyde in the form of an oil, which is consecutively washed in water and a dilute carbonate-of-soda solution, as set forth.

2. Orthonitrometamethylbenzaldehyde produced in a manner substantially as described.

In testimony that I claim the foregoing as my own I affix my signature in presence of two witnesses.

CHRISTIAN RUDOLPH.

Witnesses:
F. VOGELER,
J. GRUND.